United States Patent
Wheeler

(10) Patent No.: US 7,464,266 B2
(45) Date of Patent: Dec. 9, 2008

(54) CHEAP SIGNATURES FOR SYNCHRONOUS BROADCAST COMMUNICATION

(75) Inventor: Graham A. Wheeler, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 587 days.

(21) Appl. No.: 10/779,382

(22) Filed: Feb. 13, 2004

(65) Prior Publication Data

US 2005/0182932 A1  Aug. 18, 2005

(51) Int. Cl.
  *H04L 9/12* (2006.01)
(52) U.S. Cl. .................. 713/168; 713/176; 713/180
(58) Field of Classification Search ........... 713/177, 713/160, 400, 401, 180, 176
See application file for complete search history.

(56) References Cited

U.S. PATENT DOCUMENTS

| | | | |
|---|---|---|---|
| 6,185,678 B1* | 2/2001 | Arbaugh et al. ............... 713/2 |
| 6,215,878 B1* | 4/2001 | Harkins ....................... 380/281 |
| 6,223,285 B1* | 4/2001 | Komuro et al. ............. 713/160 |
| 6,389,419 B1* | 5/2002 | Wong et al. ..................... 707/7 |
| 6,728,878 B2* | 4/2004 | Dillon ......................... 713/160 |
| 6,760,752 B1* | 7/2004 | Liu et al. ..................... 709/206 |
| 6,766,453 B1* | 7/2004 | Nessett et al. ............... 713/171 |
| 6,816,968 B1* | 11/2004 | Walmsley ................... 713/168 |
| 6,901,593 B2* | 5/2005 | Aweya et al. ............... 718/104 |
| 6,918,035 B1* | 7/2005 | Patel .......................... 713/169 |
| 6,950,434 B1* | 9/2005 | Viswanath et al. .......... 370/392 |
| 6,976,168 B1* | 12/2005 | Branstad et al. ............. 713/175 |
| 6,985,583 B1* | 1/2006 | Brainard et al. ............... 380/44 |
| 7,043,651 B2* | 5/2006 | Aweya et al. ............... 713/400 |
| 7,065,642 B2* | 6/2006 | Sandhu et al. .............. 713/155 |
| 7,080,404 B2* | 7/2006 | Abdo et al. ..................... 726/3 |
| 7,107,464 B2* | 9/2006 | Shapira et al. ............... 726/15 |
| 7,120,816 B2* | 10/2006 | Williams et al. ............ 713/400 |
| 7,130,286 B2* | 10/2006 | Koodli et al. ............... 370/331 |
| 7,167,986 B2* | 1/2007 | Hughes et al. .............. 713/178 |
| 7,248,586 B1* | 7/2007 | Hughes et al. .............. 370/394 |
| 2001/0002929 A1* | 6/2001 | Mache ........................ 380/247 |
| 2002/0120850 A1* | 8/2002 | Walker et al. ............... 713/178 |
| 2002/0129236 A1* | 9/2002 | Nuutinen ..................... 713/151 |

(Continued)

OTHER PUBLICATIONS

Yih-Chu Hu et al. Wormhole Detection Wireless Ad Hoc Networks, Dec. 17, 2001, Rice University Department of Computer Science.*

(Continued)

*Primary Examiner*—Matthew B Smithers
(74) *Attorney, Agent, or Firm*—Merchant & Gould, P.C.

(57) ABSTRACT

A method and system are configured for synchronous broadcast communications by applying signature keys using hashing functions. Each subsequent transmission in a sequence includes a signature key that can be verified by hashing to a preceding signature key from a previous portion of the sequence. The first transmission in the sequence is signed using a signature key that is known by the client device, typically verified using some other mechanism such as asymmetric key signatures. Each client device can utilize an internal counter for the current time or the block number in the transmission sequence to maintain synchronized transmissions in the even that a particular portion of the sequence is missed, and to validate signature keys. Since the signature keys can be validated when they are received but not predicted before they are received, the transmission is difficult to attack while synchronization is maintained.

20 Claims, 10 Drawing Sheets

U.S. PATENT DOCUMENTS

| | | | |
|---|---|---|---|
| 2002/0174366 A1* | 11/2002 | Peterka et al. | 713/201 |
| 2002/0188648 A1* | 12/2002 | Aweya et al. | 709/102 |
| 2002/0191793 A1* | 12/2002 | Anand et al. | 380/255 |
| 2003/0028775 A1* | 2/2003 | Bleumer et al. | 713/176 |
| 2003/0115485 A1* | 6/2003 | Milliken | 713/201 |
| 2003/0149900 A1* | 8/2003 | Glassman et al. | 713/202 |
| 2003/0190046 A1* | 10/2003 | Kamerman et al. | 380/286 |
| 2003/0204728 A1* | 10/2003 | Irwin | 713/176 |
| 2003/0221109 A1* | 11/2003 | Boyer et al. | 713/176 |
| 2004/0025017 A1* | 2/2004 | Ellison et al. | 713/168 |
| 2004/0025018 A1* | 2/2004 | Haas et al. | 713/168 |
| 2004/0054906 A1* | 3/2004 | Carro | 713/171 |
| 2004/0064737 A1* | 4/2004 | Milliken et al. | 713/201 |
| 2004/0177369 A1* | 9/2004 | Akins, III | 725/31 |
| 2004/0221153 A1* | 11/2004 | Kim et al. | 713/150 |
| 2004/0250063 A1* | 12/2004 | Gulick et al. | 713/160 |
| 2005/0015344 A1* | 1/2005 | Athens et al. | 705/60 |
| 2005/0036616 A1* | 2/2005 | Huang et al. | 380/255 |
| 2005/0086363 A1* | 4/2005 | Ji | 709/235 |
| 2006/0010324 A1* | 1/2006 | Appenzeller et al. | 713/171 |
| 2006/0111111 A1* | 5/2006 | Ovadia | 455/439 |
| 2006/0221974 A1* | 10/2006 | Hilla et al. | 370/394 |
| 2007/0094492 A1* | 4/2007 | Carr | 713/153 |
| 2007/0101412 A1* | 5/2007 | Yang et al. | 726/5 |
| 2007/0130216 A1* | 6/2007 | Wolfgang et al. | 707/201 |

OTHER PUBLICATIONS

Steinebach et al. Watermarking-Based Digital Audio Data Authentication, Jul. 11, 2002, Hindawi Publishing Corp., EURASIP Journal on Applied Signal Processing.*

Krawczyk et al. HMAC: Keyed-Hashing for Message Authentication, Feb. 1997, IETF, RFC-2104, Network Working Group.*

Mehuron William, The Keyed-Hash Message Authentication Code, Mar. 6, 2002, Department of Commerce, Natioanl Institute of Standards and Technology.*

Perrig et al., "Efficient Authentication and Signing of Multicast Streams over Lossy Channels", May 2000, IEEE Symposium on Security and Privacy, pp. 1-18.*

\* cited by examiner

CHEAP SIGNATURES FOR SYNCHRONOUS BROADCAST COMMUNICATION

FIELD OF THE INVENTION

The present invention relates generally to broadcast systems. More particularly, the present invention relates to a system and method for assuring the integrity and authenticity of broadcast communications using time synchronized hashing functions.

BACKGROUND OF THE INVENTION

As society becomes increasingly mobile, mobile computing devices are enjoying a tidal wave of popularity and growth. Cell phones, wireless PDAs, wireless laptops and other mobile communication devices are making impressive inroads with mainstream customers. Constraining this growth and limiting customer satisfaction, however, is the lack of a truly adequate high-coverage-area, inexpensive, small, battery-efficient wireless communication system. Cellular data-transmit telephony-based solutions are far from power-efficient, and impose (relative) cost and size burdens that make them unusable. Likewise, other attempts to solve these problems have proved equally unsuitable. For instance, a few entities have attempted to make use of mobile devices that receive information over Frequency Modulated (FM) sub-carriers. FM sub-carriers (e.g., FM sub-carriers using "SCA" or Subsidiary Communications Authorization) utilize [GW1] the available frequencies above FM stereo within the available modulation bandwidth of an FM station. Sub-carriers are typically leased from radio stations, subject to FCC or other national regulation.

Broadcast communications such as FM sub-carrier based transmissions present unique challenges to ensure data integrity. The transmissions are freely available to anyone with an appropriate receiver and so the channel is highly insecure. Typically the communication is strictly one way, so the sender cannot know the state of the recipients. Various cryptographic methodologies have been utilized in an attempt to create a secure environment for the exchange of information. Many of the proposed cryptographic methodologies are robust solutions that require overhead processing that may be unsuitable in many portable device applications.

SUMMARY OF THE INVENTION

Briefly stated, the present invention is related to a method and system of synchronous broadcast communications by applying signature keys using hashing functions. Each subsequent transmission in a sequence includes a hashing function that is dependent on a preceding hashing function from a following portion of the sequence. The first transmission in the sequence is hashed using a secret key that is revealed to the client device only at the end of that transmission, and whose authenticity and integrity is guaranteed by other, typically more costly, means. Each client device can utilize an internal counter for the current time or the block number in the transmission sequence to maintain synchronized transmissions in the event that a particular portion of the sequence is missed, and to validate signature keys. Because of the initial synchronization and the synchronized counters, unauthorized retransmissions can be detected and rejected.

A more complete appreciation of the present invention and its improvements can be obtained by reference to the accompanying drawings, which are briefly summarized below, to the following detailed description of illustrative embodiments of the invention, and to the appended claims.

DETAILED DESCRIPTION OF THE PREFERRED EMBODIMENT

The present invention is described in the context of a communication system that includes client devices (receivers). As will become apparent from a reading of the following detailed description, the client devices receive broadcast transmission from one or more broadcast towers. The broadcast transmissions are provided according to a frame protocol that includes provisions for data integrity and authenticity using a time synchronized method.

Broadcast communications presents unique challenges for ensuring data integrity. Data integrity is particularly problematic when one or more of the recipients is untrustworthy such that the use of shared (symmetric) keys to protect the communications may be inadequate. Under such circumstances, asymmetric cryptosystems offer the best approach, as symmetric keys can be compromised, and also offer no non-repudiation. The communications are preferably time-synchronous such that cryptographic elements incorporate a time based parameter, to prevent replay. Signatures can be chained from one signed block to the next to provide an alternative form of synchronization. However, even asymmetric signatures may be vulnerable to replay attacks, especially when the replay is directed at recipients that did not receive the original communication. An additional problem with the asymmetric approach is that the computational overhead can be costly. For low-powered devices, and in particular battery-powered devices, the computation overhead may be cost prohibitive.

The methodology for providing cheap signatures described herein illustrates an approach to signing blocks of data that combines asymmetric cryptography with shared secrets in a way that minimizes cost based on the assumption that communications are synchronous in the sense that the sender and recipient share a common value (e.g. time, packet number) which they can trust, even if such value is not confidential. Although the approach does not provide non-repudiation (as the symmetric secrets are gradually revealed and lose their secrecy), the approach does provide authenticity and integrity under this synchronization condition. The described techniques are useful in a number of applications of broadcast technology, including satellite TV applications, and portable electronics devices.

Example System

Figure 1:
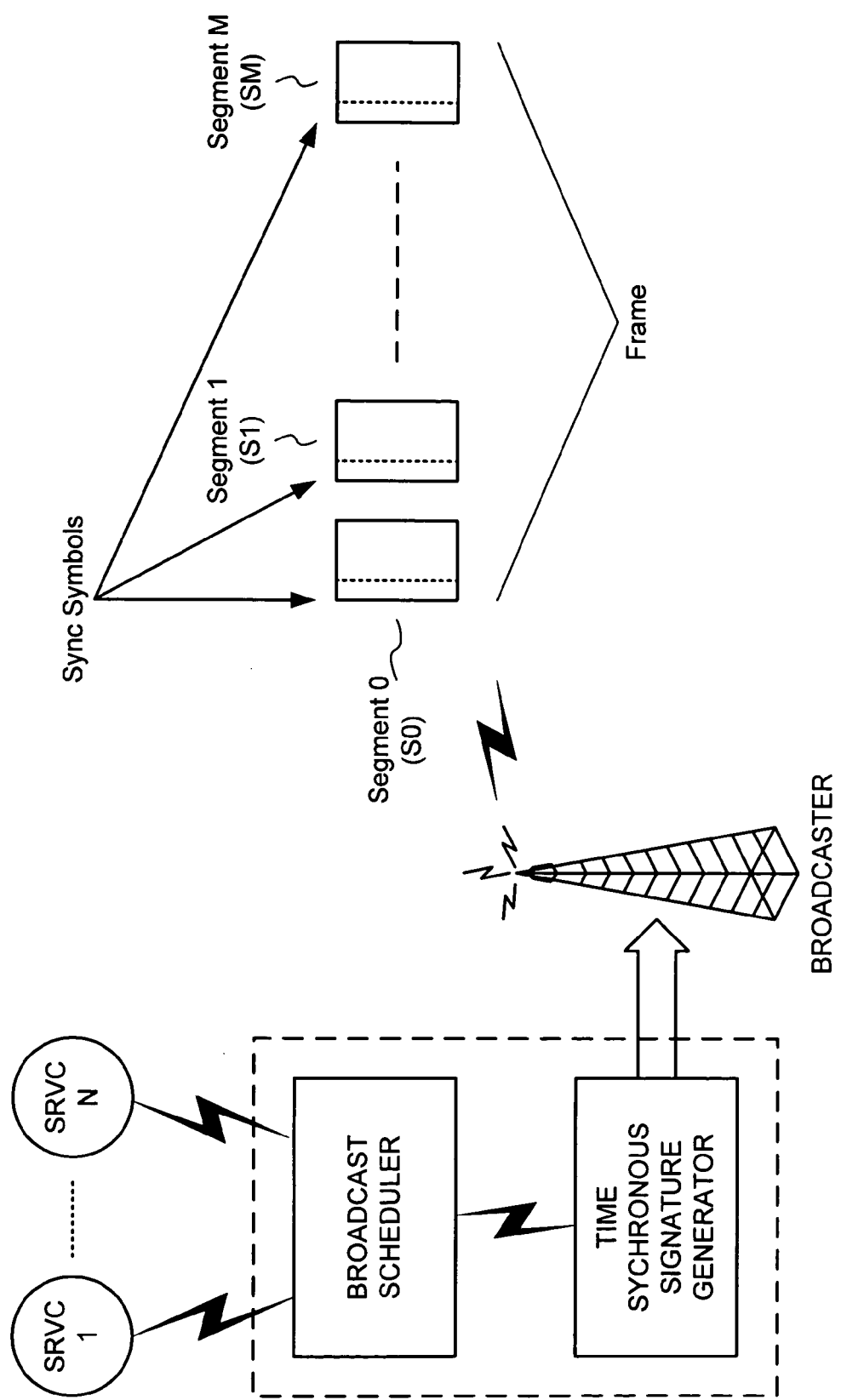
FIG. 1 is a diagram illustrating functional components in an example system.

FIG. 1 is a diagram illustrating functional components in an example system that is arranged according to an aspect of the present invention. A broadcast transmitter tower is arranged to provide a communication signal that is configured for reception by a device such as a wireless client devices. The broadcast tower (e.g., an FM sub-carrier transmission tower) is arranged to transmit signals as directed by a broadcast server that includes a broadcast scheduler block. A time-sychrononous signature generator[GW3] block is also included in the broadcast server to provide authentication signatures for the data transmission.

The broadcast scheduler is configured as a means for selecting one or more services. In one example, a user of a client device interacts with a scheduling interface to select services such as news, stock prices, weather, and other features such as a personal calendar, address book, and the like. The scheduling interface may be a web-based interface that includes provisions to customize subscription to broadcast services. The selected services are communicated to the scheduler, and queued for later transmission. At the designated time (or time interval) the scheduler retrieves serialized data from one or more selected services (e.g., SVC1-SVC N). The scheduler prioritizes the scheduling of transmissions with the broadcast tower or broadcaster.

Scheduled transmissions that are desired for secure transmission are communicated to the time stamped encryption block. The time-stamped encryption block is arranged to generate encryption keys and hashing codes that are used in the encryption process. The broadcast server subsequently formats the serialized data into encrypted message streams for one or more wireless client device, queues the data for transmission, and communicates the queued data to the broadcast tower for transmission. The broadcast scheduler block may be integrated together with the broadcast server, or as a separate component.

Each broadcast transmission corresponds to the transmission of a frame that is arranged in accordance with a frame protocol. Each frame includes a frame header and multiple data streams. The frame header describes the transmission environment with respect to parameters such as frame number identifier, transmission time, time zone identifier, service region identifiers, as well as other environmental information.

Streams can be categorized as shared data (or broadcast/ public streams), or private data (aka personal data) that is identified with a specific client (subscriber). Each frame includes indexing mechanisms to identify the location of specific streams within the frame, as well as additional mechanisms for cryptography in secure streams.

Operating Environment

Figure 2:
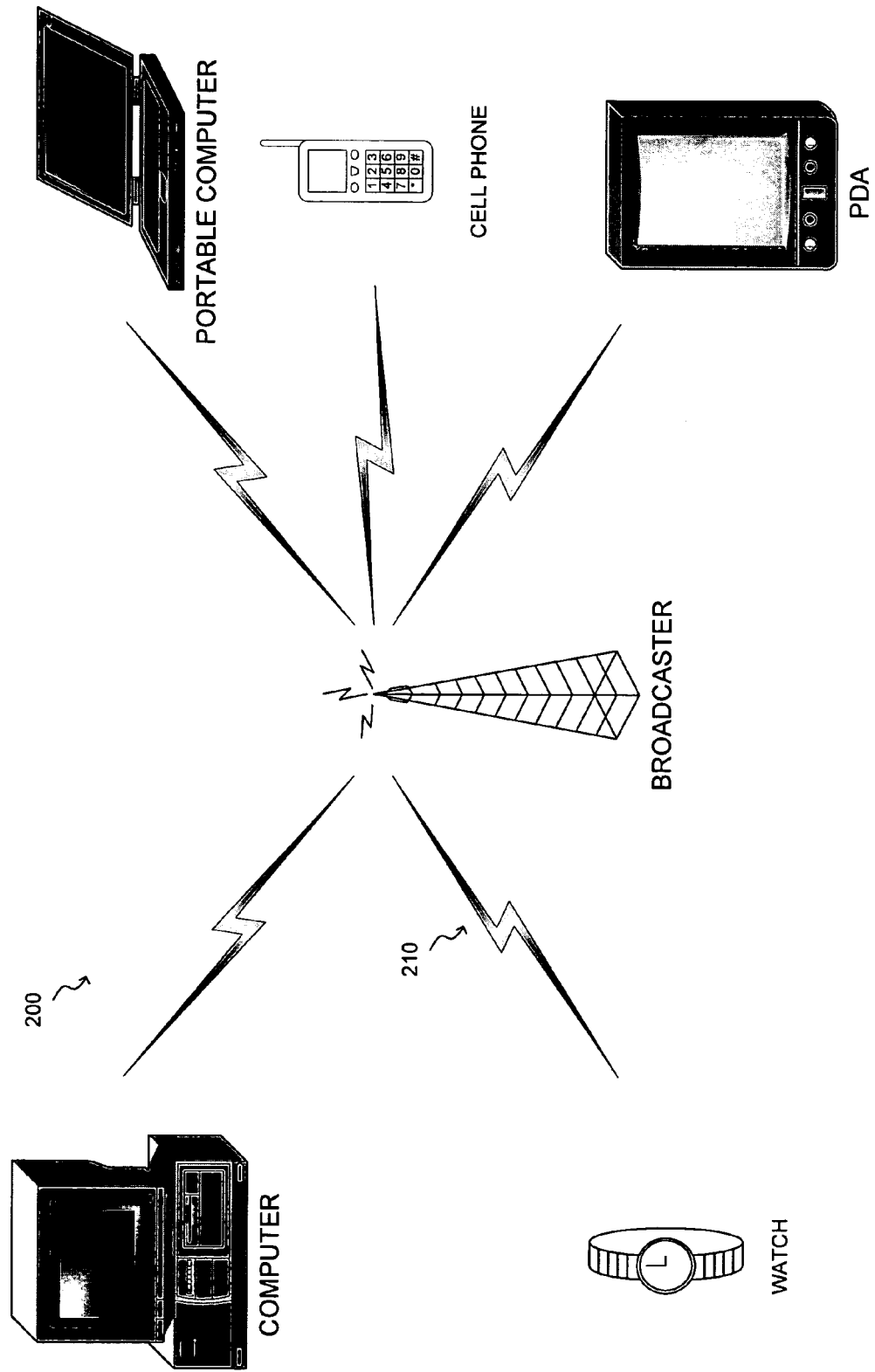
FIG. 2 is a diagram illustrating an example operating environment.

FIG. 2 is a diagram illustrating an example operating environment (200) for wireless clients that are arranged in accordance with an aspect of the present invention. As illustrated in the figure, a broadcast transmission or broadcast is transmitted over a communication channel (210) to various electronic devices. Example electronic devices that have a broadcast receiver may include a desktop computer, a watch, a portable computer, a wireless cellular telephone (cell phone), and a personal data assistant (PDA). The electronic devices are arranged to receive information from the broadcast. The broadcast format may be of any number of types including but not limited to: a standard FM transmission, a sub-carrier FM transmission, or any other type of FM transmission as may be desired.

FM sub-carriers are often referred to as an SCA as identified by the Federal Communications Committee (FCC) term for the Subsidiary Communications Authorization. An FM sub-carrier utilizes bandwidth that is otherwise unused in the FM stereo-band about an FM station. In the United States of America the FCC requires the modulation bandwidth to be roughly from 53 KHz to 100 KHz within the modulation bandwidth of the FM station.

Example electronic devices that may include an electronic system that is arranged to operate according to the interaction model are illustrated in FIG. 2. The electronic system may employ a wireless interface such as the transmission systems that are described above. Each of the electronic systems receives message streams over the communication channel.

Each broadcast transmission corresponds to the transmission of one or more frames. Each frame may include multiple messages, where some messages are public broadcast (aka "global" or "shared" messages), while other messages are client specific messages (aka "personal" or "private" messages). Every client that is located within the designated service region may receive shared or public data, while a single client may decode private data.

Electronic devices (e.g., a wireless watch device) receive packets that are directed to the client device. Packets are organized in groups according to logical slot (or channel) entry numbers. Slots are associated with broadcast services that correspond to a station of channel. Each electronic device may be configured to receive a different group of channels. The packets associated with each of those channels is received, processed, and stored in the client device. The stored packets are retrieved by applications that reside on the client device. Each application on the client device is associated with a particular service that is associated with the broadcast server and the particular channel. Example channels include: a time channel, a messages channel, a contact channel, a calendar channel, a weather channel, a stocks channel, a news channel, and a games channel.

Illustrative Watch-Based Electronic System

Figure 3:
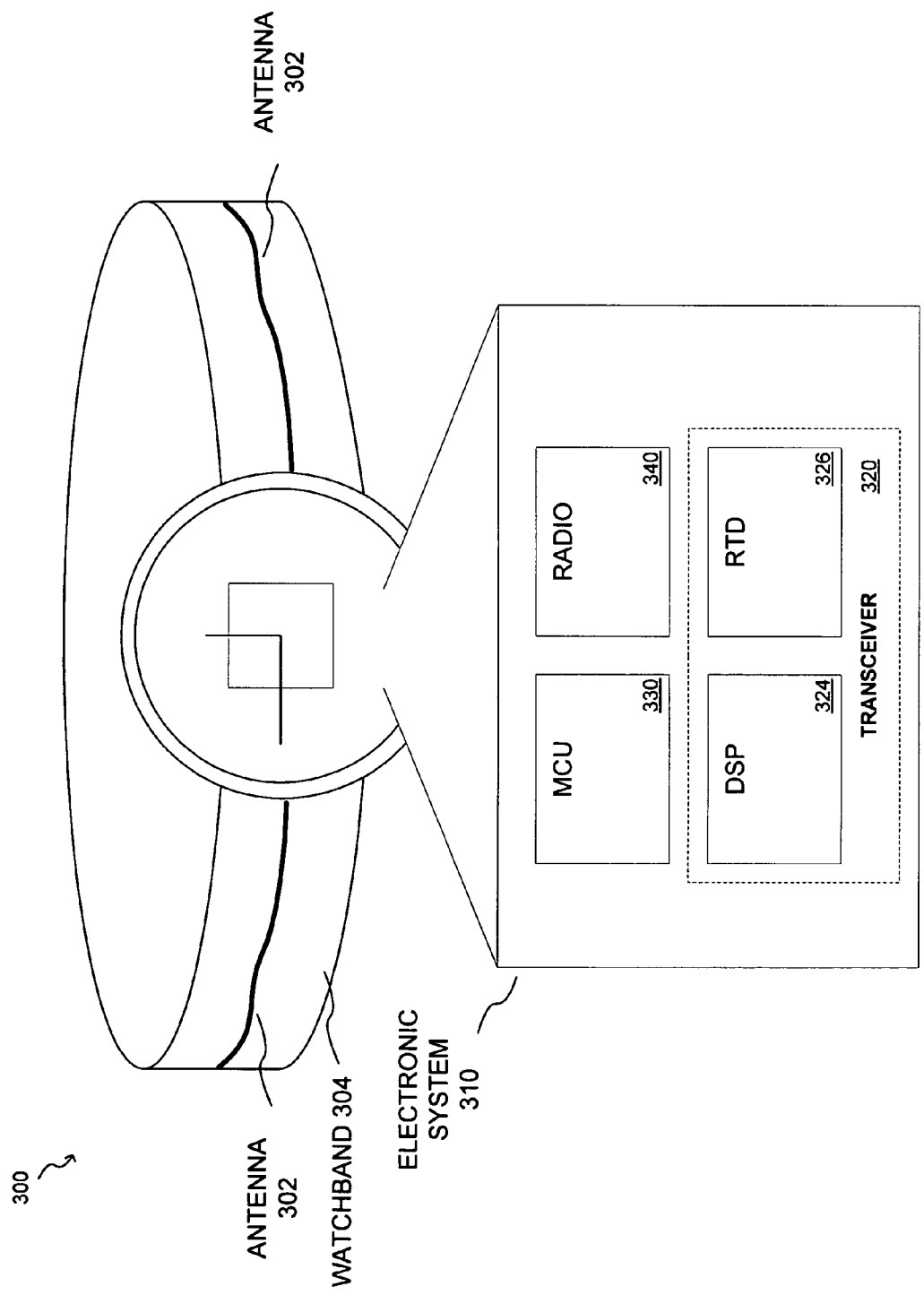
FIG. 3 is a diagram illustrating a watch device that includes an electronic system.

FIG. 3 illustrates an exemplary watch device (300) that includes an electronic system (310) that is configured to operate in accordance with the present invention. The watch device (300) includes a watchband (304) that includes an antenna (302) that is either attached to the watchband or integrally formed within the watchband (304). The antenna (302) is coupled to the electronic system (310) that is contained in the watch. The electronic system (310) may be contained in the bezel as shown in FIG. 3, or in some other portion of the watch device (not shown).

The electronic system (310) is arranged to operate as either a receiver or transceiver type of device. As illustrated in the figure, the electronic system includes a transceiver (320), a microcomputer unit (MCU 330), and an analog radio (340). The antenna connects to, and is controlled by, the transceiver (320). Transactions between the MCU (330) and the radio components are mediated over a MCU-digital transceiver interface. The components of the watch device (300) are housed in a watch-sized enclosure and rely on battery power for operation.

The transceiver (320) generally includes a digital signal processor (DSP 324), which performs control, scheduling, and post-processing tasks for the transceiver, and a real time device (RTD 326), which includes a digital radio, system timing, and real-time event dispatching. The DSP (324) is coupled to the MCU (330), and transceiver tasks are commanded by the MCU (330).

One of the DSP's tasks may process received data for such purposes as sub-carrier phase recovery, baud recovery and/or tracking, compensation for fading effects, demodulation, deinterleaving, channel state estimation and error-correction. The post-processing of packets may occur when an entire packet has been received, or another subsequent time. The DSP (324) analyzes the transmitted data packets to determine the station's signal timing with respect to the local clock of the RTD (326). The local clock is synchronized with the transmitter's clock signal to maintain signal sampling integrity. The receiver is periodically brought into symbol synchronization with the transmitter to minimize misreading of the received data.

The digital section of the RTD (326) may include system time-base generators, such as a crystal oscillator that provides the system clock for the MCU (330) and the DSP (324). The time-base also provides baud and sample timing for transmit and receive operations, start/stop control for radio operation, and controls the periods of clock suspension to the MCU (330) and the DSP (324). The RTD (326) also performs radio operations, and may perform additional operations as well. The radio (340) is arranged to receive segments of data that is arranged in packets.

The operating environment shown in FIGS. 1 and 2 are only examples of suitable operating environments and are not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

Example Computing Device

Figure 4:
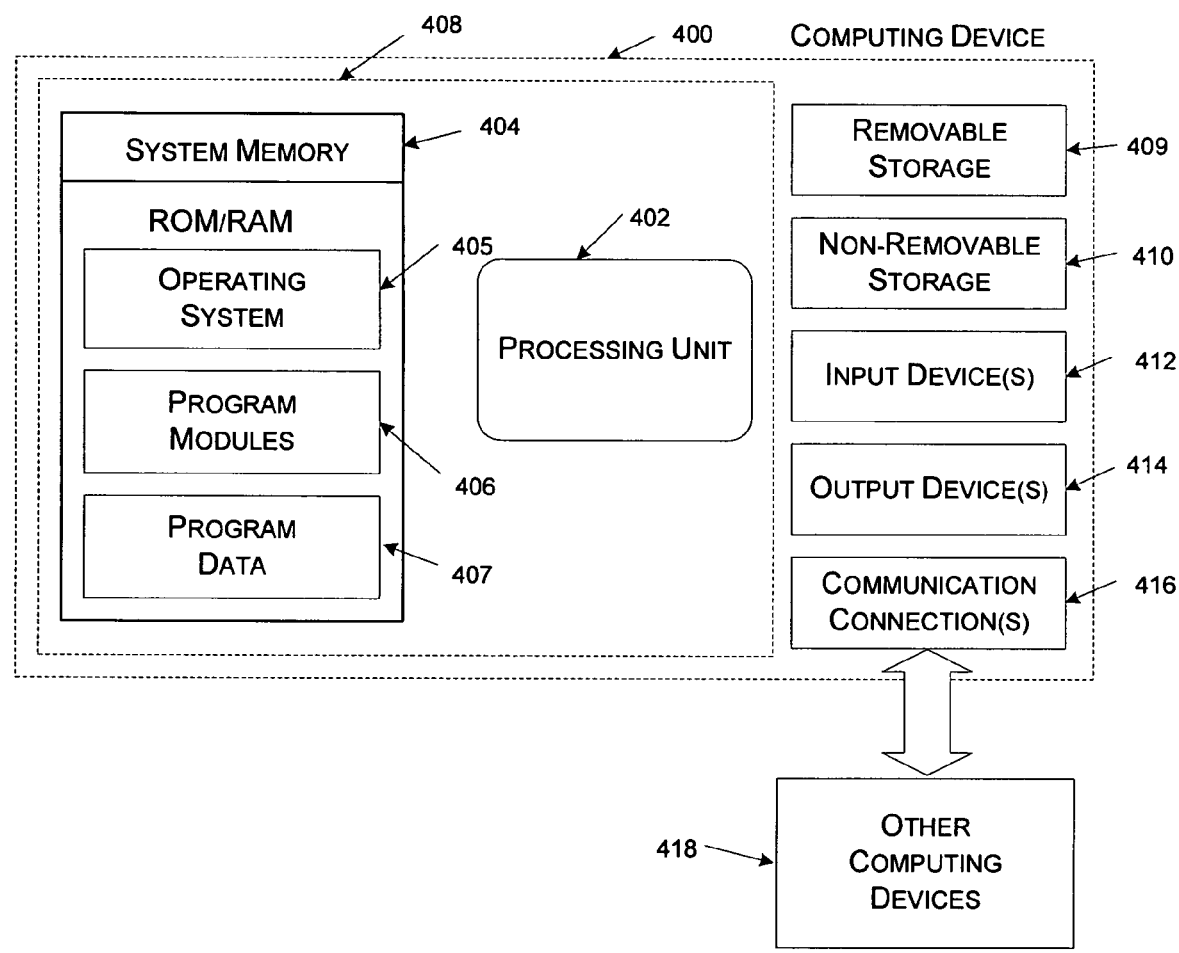
FIG. 4 is a block diagram of an example computing device.

FIG. 4 is a block diagram of an example computing device that is arranged in accordance with the present invention. In a basic configuration, computing device 400 typically includes at least one processing unit (402) and system memory (404). Depending on the exact configuration and type of computing device, system memory 404 may be volatile (such as RAM), non-volatile (such as ROM, flash memory, etc.) or some combination of the two. System memory 404 typically includes an operating system (405), one or more program modules (406), and may include program data (407). This basic configuration is illustrated in FIG. 4 by those components within dashed line 408.

Computing device 400 may also have additional features or functionality. For example, computing device 400 may also include additional data storage devices (removable and/or non-removable) such as, for example, magnetic disks, optical disks, or tape. Such additional storage is illustrated in FIG. 4 by removable storage 409 and non-removable storage 410. Computer storage media may include volatile and non-volatile, removable and non-removable media implemented in any method or technology for storage of information, such as computer readable instructions, data structures, program modules or other data. System memory 404, removable storage 409 and non-removable storage 410 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of device 400. Computing device 400 may also have input device(s) 412 such as keyboard, mouse, pen, voice input device, touch input device, etc. Output device(s) 414 such as a display, speakers, printer, etc. may also be included. All these devices are known in the art and need not be discussed at length here.

Computing device 400 also contains communications connection(s) 416 that allow the device to communicate with other computing devices 418, such as over a network. Communications connection(s) 416 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, microwave, satellite, infrared and other wireless media. The term computer readable media as used herein includes both storage media and communication media.

Various procedures and interfaces may be implemented in one or more application programs that reside in system memory 404. In one example, the application program is a broadcast scheduler application. In another example, the application program is an encryption procedure that is provided in system memory 404 of a broadcast block. In still another example, the application program is a decryption procedure that is provided in system memory 404 of a client device.

Transmission Format

Figure 5:
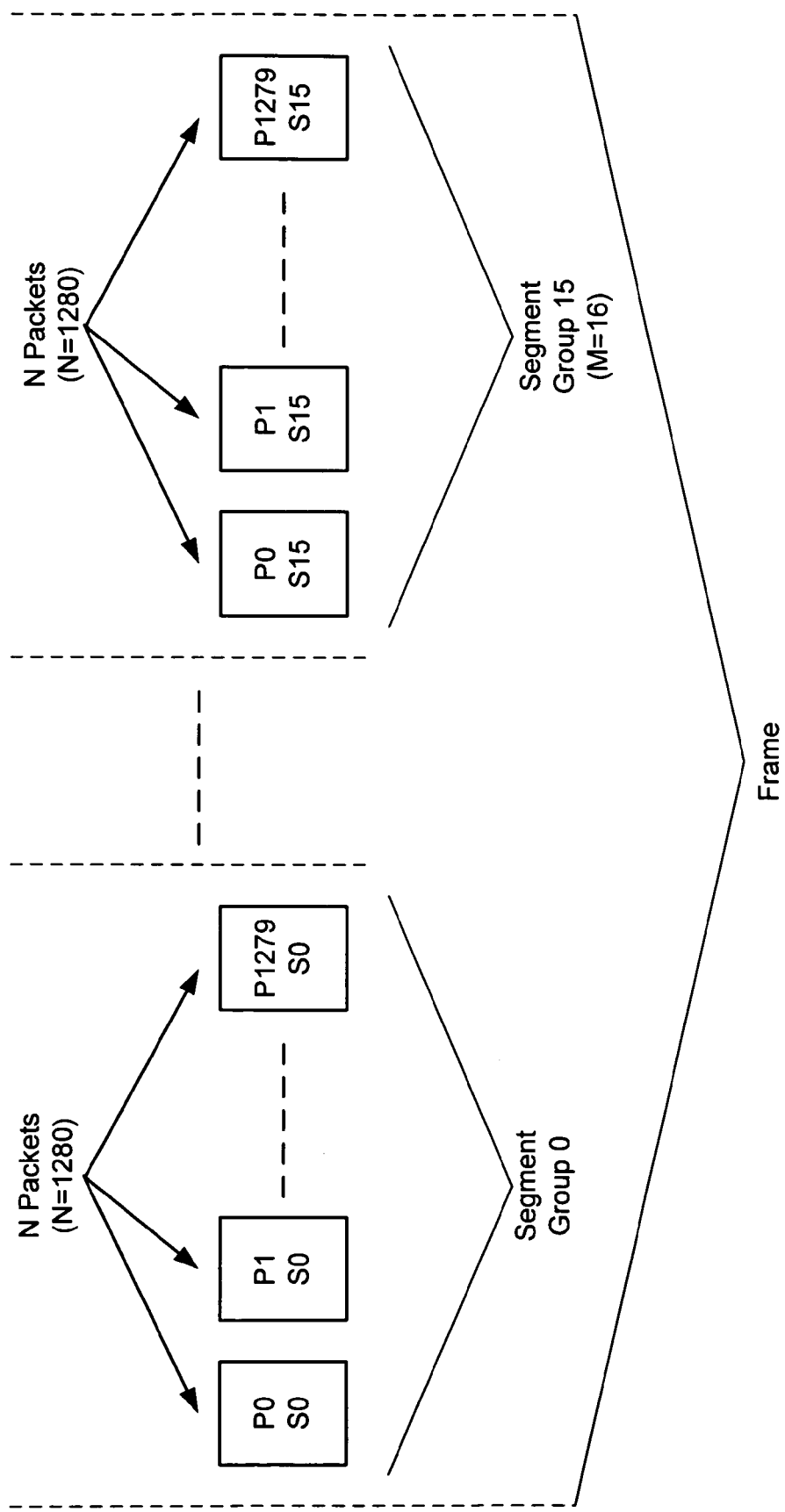
FIGS. 5 and 6 are diagrams illustrating frame transmission sequences.
Figure 6:
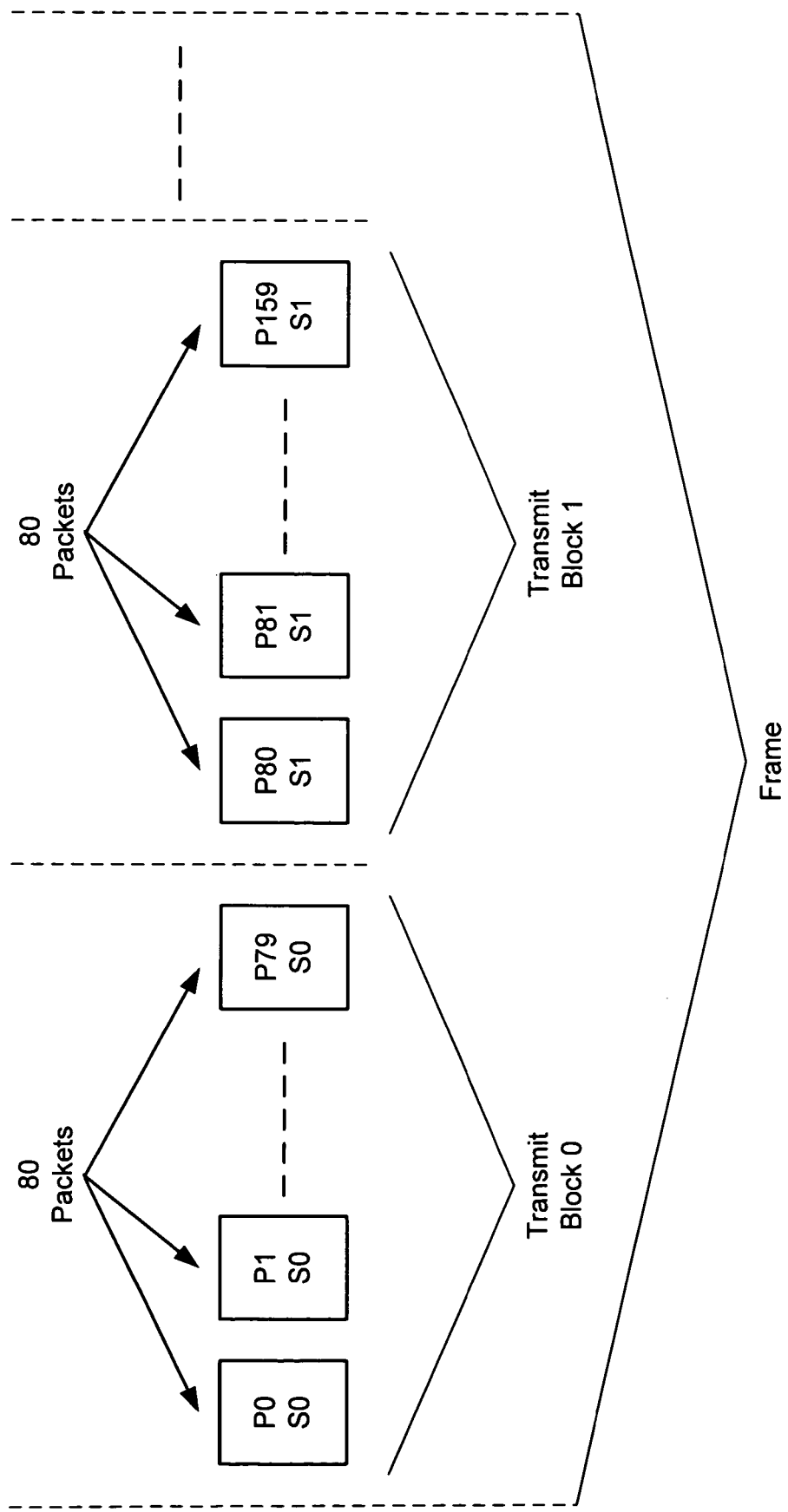

FIGS. 5 and 6 are diagrams illustrating frame transmission sequences for a system that is arranged according to an aspect of the present invention.

In FIG. 1, each transmission frame is broken into a number of segments (M). The first portion of each segment includes synchronization (Sync) symbols. The frame is distributed over M segments (S1-SM) such that data integrity is improved. The receiver in the client device establishes timing functions for reception of the data signals with the sync symbols. Each segment includes a number (N) of packets. The order of transmission of various packets and segments may be modified such that frames are interleaved or contiguous.

In FIG. 5, each frame includes 16 segment groups that are transmitted as interleaved segments. Each segment includes 1280 packets such that an entire frame includes 20,480 segments. Every packet (Px) for a given segment (Sx) is transmitted in sequence before packets for the next segment are transmitted. The transmission sequence for an example frame is: (S0P0, S0P1 . . . S0P1279); (S1P0, S1P1, . . . , S1P1279); . . . ; (S15P0, S15P1, . . . , S15P1279). According to this example, a new frame transmission begins after the 20,480 segments of the preceding frame are completed.

In FIG. 6, each frame is divided into blocks of 80 packets from one of 16 segment groups. Packets (Px) for a given segment (Sx) are transmitted in an interleaved sequence with packets for the next segment. Each transmission block consists of 80 packets from a particular segment. The transmission sequence for the frame is shown as: (S0P0, S0P1 . . . S0P80); (S1P80, S1P81, . . . , S1P159); . . . etc. According to this example, frame reception of all 20,480 segments is interleaved such that frames are completed on a rolling basis.

Signing Block Diagram

Figure 7:
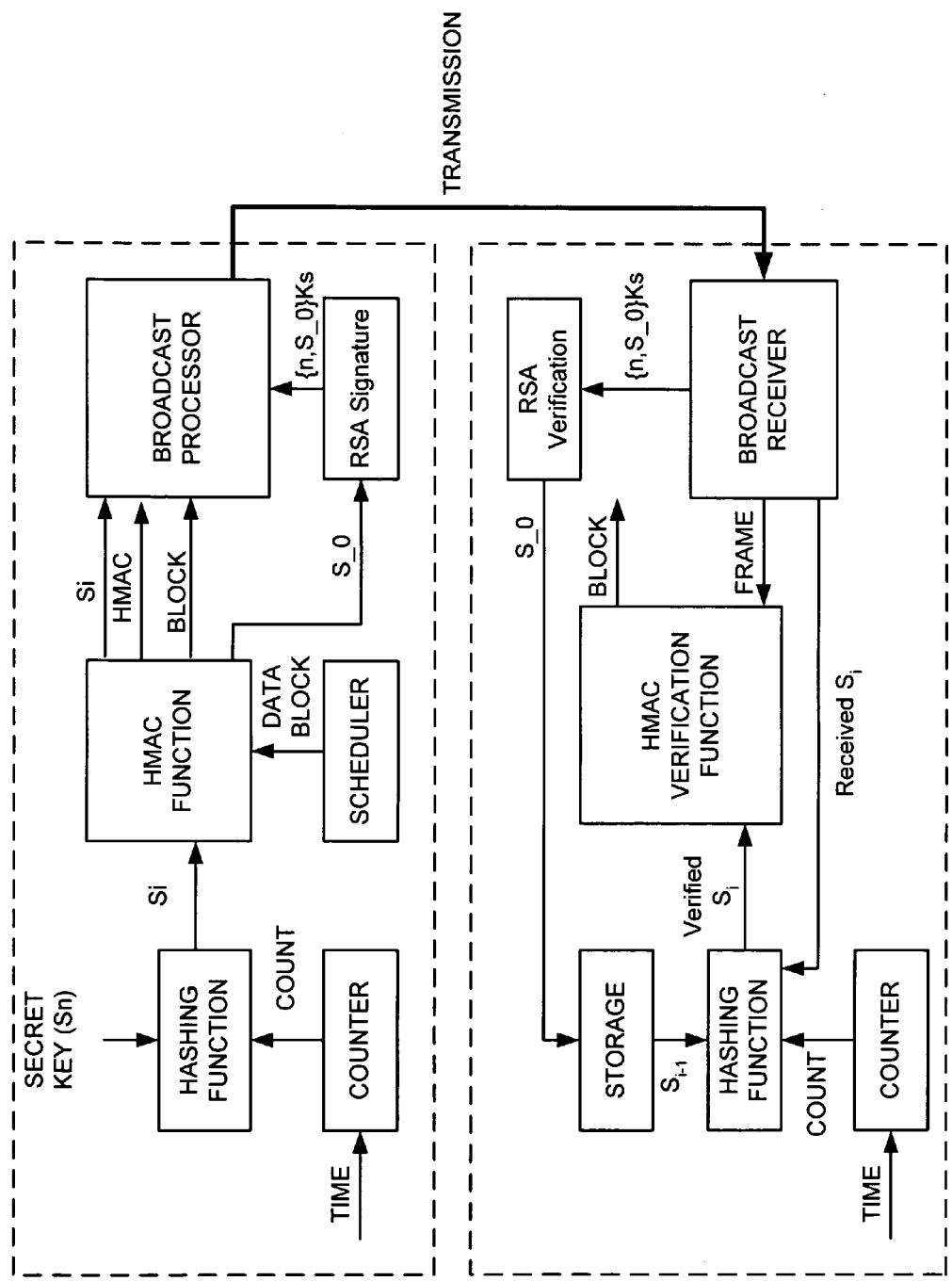
FIG. 7 is a functional diagram of an example signing system.

FIG. 7 is a functional diagram of an example signing system that is arranged in accordance with an example embodiment of the present invention. The signing system includes a scheduler, counter, and a hashing function that cooperate with a broadcast processor to assemble frames for transmission. A verification system is employed to validate the received transmission frame, and includes a broadcast receiver, verification function block, a counter, a hashing function, and a storage element.

In the transmitter portion of the system, the counter is responsive to increments in time such as from a system clock. The counter provides an increasing index or count that is associated with a particular time stamp or block number in the transmission sequence. The hashing functions is arranged to generate signatures based on the count (or time stamp) and a secret key ($S_0$). The scheduler provides a data block to the hashing function for signing the block with the calculated key signature. The broadcast processor receives the signing key, the signed block, and the signature (keyed hash or HMAC) to provide a verifiable broadcast transmission. In addition, the HMAC functional block may output an S_0 signal to an RSA signature block, which in turn provides a signed datum signal, {n,S_0}Ks, to the broadcast processor.

In the receiver portion of the system, the counter is again responsive to increments in time such as from a system clock, where a master clock time may be periodically transmitted for synchronization. The counter again provides an increasing index or count that is associated with a particular time stamp or block number in the transmission sequence. The hashing functions is again arranged to generate signatures based on the count (or time stamp) and a secret key ($S_0$). The broadcast receiver receives a transmitted frame and provides the frame to the verification function block. The verification function block is responsive to a calculated and verified signing key (next hash), a stored HMAC, the count, and the received frame to provide a decrypted block. In addition, the Broadcast Receiver may output a signed datum signal, {n,S_0}Ks, to an RSA verification block, which verifies the signature and in turn provides a secret key S_0 to the storage.

Each signed block is associated with a monotonically increasing index. For the example illustrated in FIG. 7, the increasing index corresponds to a count associated with time. However, the time increment may be used to increment the block number in the transmission sequence. Ideally, a recipient knows precisely the index of the next block to expect (the synchronous condition). Under conditions of time synchronous or 100% reliable communications, this is always viable. Under non-time synchronous unreliable communications a recipient may not know the precise index of the next expected block such that an attacker may be able to forge signatures for blocks were sent by the sender but not previously received by the recipient. However, the use of the public key (e.g., RSA key) is known by both the sender and the recipient to provide enhanced time-synchronous cryptography.

Time Synchronized Hashing Functions

Keyed hashes (HMACs) are used to generate digital signatures to provide secure signatures in the broadcast transmission. HMACs require a shared secret key, which, as described earlier, is inappropriate for broadcast as the secret is exposed to attackers. However, the risk of interception of the shared key can be avoided (provided non-repudiation is not a requirement) by sending the secret key after the block and its corresponding signature, providing two requirements are met. A first requirement is that the recipient must trust that the secret key was chosen by the sender to be used for the specific block, and not by an attacker. A second requirement is that the synchronization mechanism is robust enough that the recipient can know that an attacker would not have been able to prevent the block from being received, capture the secret for that block, and then transmit a fake block with a valid signature using the same secret.

Signing with the secret key is only viable when the information that is signed allows the recipient to verify the secret key (and thus the signature) without being able to guess the secret key before it is used. In a real time system such as the distributed segment and packets systems previously described, a very long time period passes before the secret key would be located such that retransmission is ineffective. Moreover, the real time system requirements only require a signature key to be provided occasionally since the client device can store a valid key, only requiring it to be updated occasionally. An example procedure is described below.

The sender chooses a secret key ($S_n$). The sender then applies a one-way hashing function (such as a cryptographic hash) f to the secret key ($S_n$) for a chosen number of iterations n, where n is the number of blocks that can be signed based on the secret. The hashing function yields a number of values:

$$S_{n-1}=f(S_n)$$

$$S_{n-2}=f(S_{n-1})$$

$$\ldots$$

$$S_0=f(S_1)$$

The sender then signs $S_0$ with their private asymmetric key and sends that to the recipients. In one example, the signed data includes the index of the next block k+1. In another example, the index of the next block is implicit and can be omitted. The recipient verifies the signature using the sender's public key, and stores the association (k, $S_0$).

When the sender is ready to send block $B_i$, (for i=k+1, k+2, ...) the sender computes the HMAC $H_i$ of $B_i$ using key $S_{i-k}$, and sends the HMAC $H_i$, block $B_i$, and secret $S_{i-k}$, preferably in that order (the security of the system improves the greater the delay between the sending of the HMAC $H_i$ and the secret $S_{i-k}$ used to compute it; in one embodiment of the invention of the secret $S_i$ is transmitted only in a subsequent block $B_j$ where j>i). The recipient first verifies that the received secret $S_{i-k}$ satisfies the condition:

$$S_{i-k-1}=f(S_{i-k}),$$

(Equivalent to:

$$S_0=f_{i-k}(S_{i-k})$$

) and then verifies the HMAC $H_i$. If both are valid, the recipient can discard $S_{i-k-1}$ and instead store the association (i+1, $S_{i-k}$), ready for the next block. This process continues until all n blocks have been received, where block $B_{k+n}$ is signed with key $S_n$. Since each key $S_i$ is received after the transmission of the data it was used to sign, the possibility of receiving the key and retransmitting a broadcast that is accepted as valid is highly unlikely due to limited processing power and time.

In the case of unreliable but time-synchronized communication, a recipient may receive a block $B_s$, followed by a block $B_t$, where t−s>1. The recipient of block $B_t$ can verify that the signing secret (St) satisfies the condition given by:

$$S_s=f^{t-s}(S_t).$$

Example Frame Header Signatures

Figure 8:
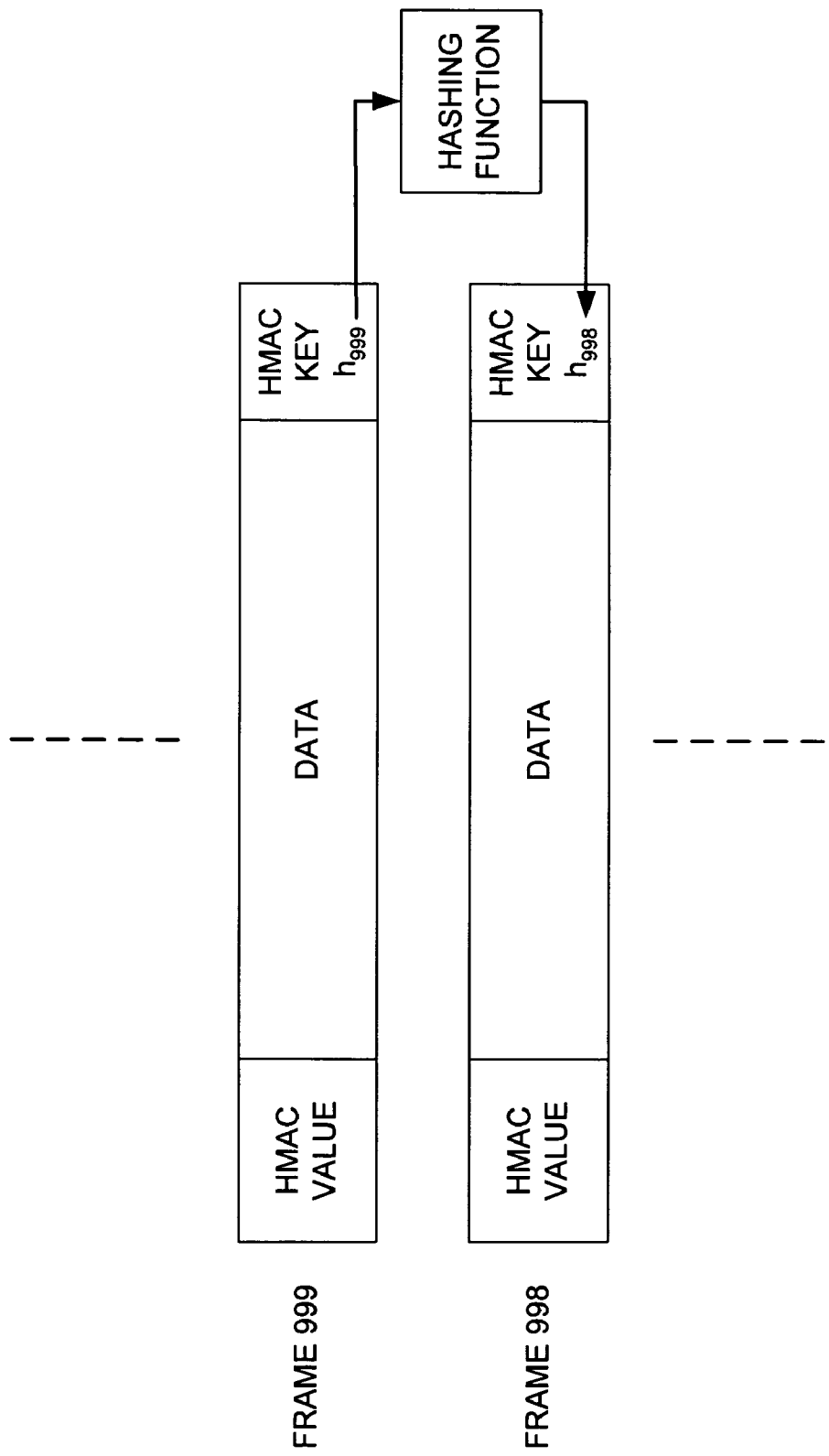
FIG. 8 is a diagram illustrating example frames including provisions for signing.

FIG. 8 is a diagram illustrating example frames including provisions for encryption. Each frame includes a frame header that includes data fields, an HMAC value, and an HMAC key. The data fields are signed using the HMAC function and the HMAC key. In one example sequence, 1000 frames (0-999) are transmitted in sequence. Frame 998 includes a HMAC key corresponding to $h_{998}$, while frame 999 includes an HMAC key that corresponds to $h_{999}$. Hash key $h_{999}$ is verified by hashing it and ensuring the result matches hash key $h_{998}$.

Since the HMAC key is received further along in the time line for transmission than the HMAC value, the late arrival of the HMAC key is not very helpful since the remainder of the transmission is gone. The window of opportunity for a replay attack is very small if it exists at all, since the client device can use its own internal clock and information from the last received frame to close the window between that last frame and the next one expected.

Example data fields in the header may include, $\{n, S_0=f^n(S_n)\}K_S$, where n corresponds to the number of frames protected by the secret, $S_n$ is the initial secret or seed for the hashing function, $\{\}K_S$ connotes that the contained fields are signed by asymmetric private key $K_S$, and $f^n(Sn)$ is a hashing function using the seed.

Example Signing Procedure

A sender generates a secret value ($S_n$) that is used for a number of transmitted frames, corresponding to n. The sender then computes a sequence of hashes using the secret key ($S_n$) as an initial seed and hashing functions f, $S_{n-1}=f(S_n)$, $S_{n-2}=f(S_{n-1})$ ..., $S_1=f(S_2)$, $S_0=f(S_1)$. For each frame (F) and sequence (i), the sender computes $H_i=HMAC(F_i, S_i)$. The signed frame is transmitted by the broadcaster (see previous discussion) starting with $\{n, S_0=f^n(S_n)\}K_s$, and ending with the secret $S_i=f^{(n-i)}(S_n)$. A new secret key ($S_n$) is generated after the transmission sequence is complete when i=n.

Figure 9:
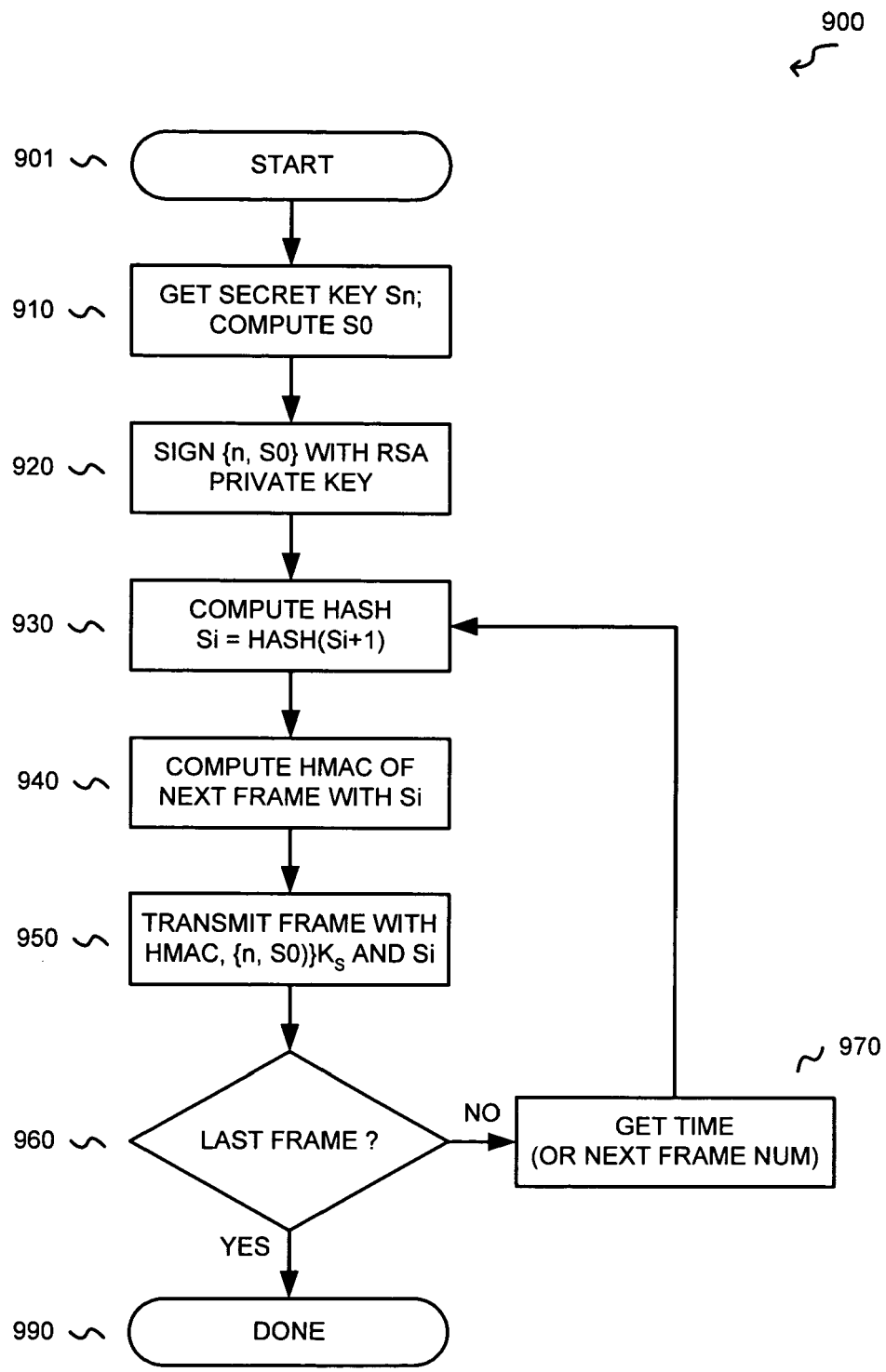
FIG. 9 is a diagram of process flow for a broadcast server that is configured to sign data.

FIG. 9 is a diagram of process flow (900) for a broadcast server that is configured to sign data according to an aspect of the present invention. Processing begins at block 901, and proceeds to block 910. At block 910, the secret key $S_n$ is retrieved from a storage location such as memory. At block 920, the initial value $S_0$ is computed (see previous discussion for details). Continuing[GW5] to block 920, RSA signing is applied to $S_0$ and n, where n corresponds to a number of frames that can be signed based on the secret key. Flowing to block 930, $S_i$ (i=1, 2 . . . ) is computed from $S_n$ by iteratively applying a one-way hashing function to the secret key ($S_n$) for a number of iterations n corresponding to the number of blocks ($S_i=HASH(S_{i+1})$).

Processing continues from block 930 to block 940. At block 940 the HMAC is computed for the next frame for transmission as a digital signature using the key $S_i$. The HMAC, RSA-signed datum $\{n, S_0\}K_S$, block, and HMAC key $S_i$ are transmitted over a communication channel at block 950. Continuing to decision block 960, the broadcast server evaluates the total number of frames required in the current transmission. Processing continues from decision block 960 to block 970 when additional transmission frames need to be processed. Alternatively, processing continues from decision block 960 to termination block 990 when all transmission frames have been processed. At block 970, time is incremented (or the frame number is incremented) and processing continues from block 930 as previously described.

Example Verification Procedure

A recipient receives a first frame in a transmission sequence. Upon reception, the recipient verifies the RSA signature (K_RSA or $K_r$) and stores HMAC key $S_0$. As described previously above, each received frame is signed, where the transmission began with $\{n, S_0=f^n(S_n)\}K_s$, and ended with the secret $S_i=f^{n-i}(S_n)$. For each received frame (F) in sequence number i, the sender determines if the received HMAC key, $S_i$, is verified as satisfying $S_i=f^{(n-i)}(S_n)$ (or, if the previous frame was verified, the equivalent but faster test $S_i=f(S_{i-1})$). When $S_i$ is determined to be valid, the recipient verifies the HMAC value by checking if $H_i=HMAC(F_i, S_i)$. The recipient accepts frame $F_i$ as authentic when HMAC value $H_i$ is valid.

Figure 10:
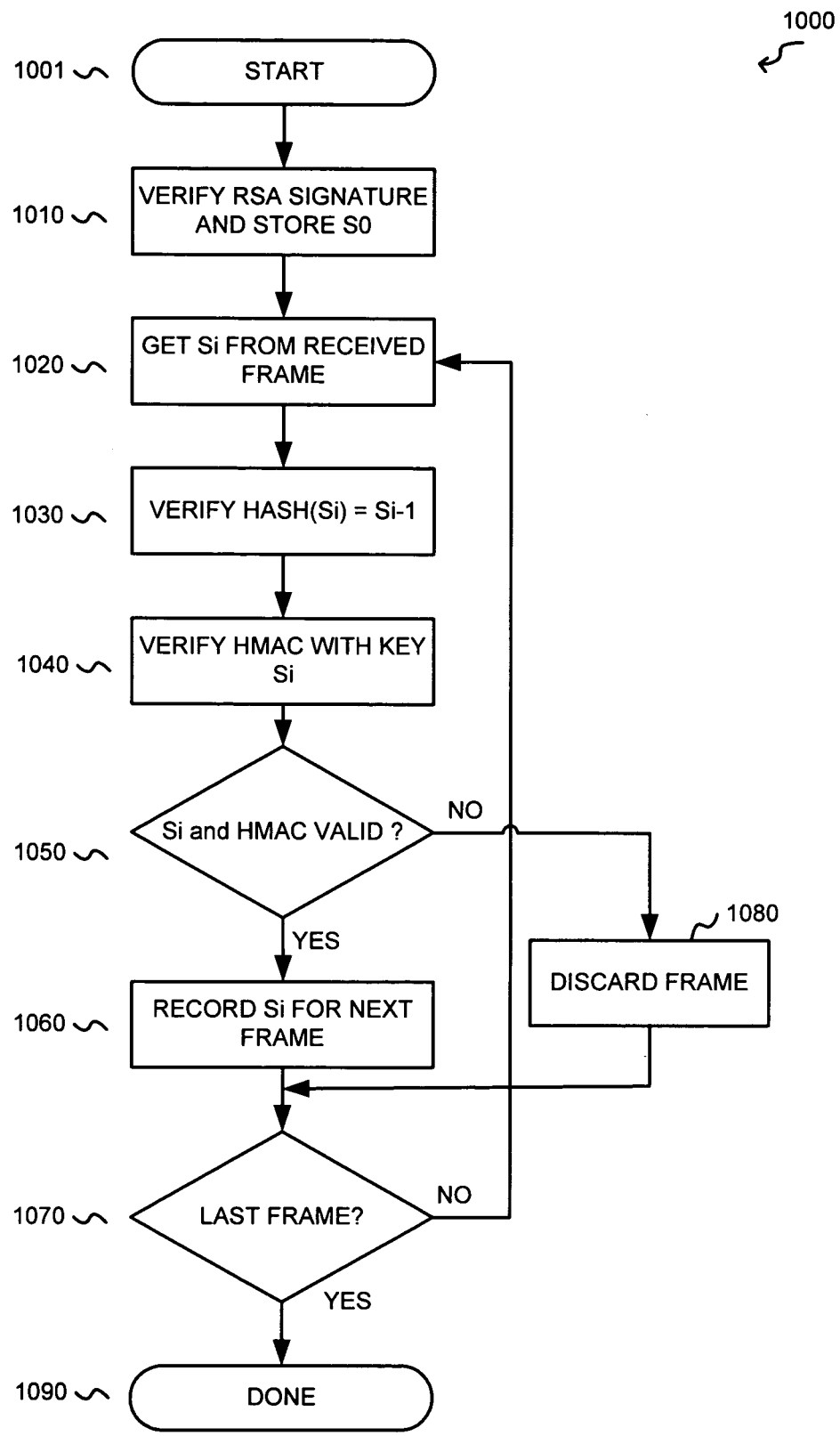
FIG. 10 is a diagram of process flow for broadcast receiver that is configured to receive signed data, arranged in accordance with the present invention.

FIG. 10 is a diagram of process flow for broadcast receiver that is configured to receive signed data according to an aspect of the present invention. Processing begins at block 1001, and proceeds to block 1010. At block 1010, the RSA signed datum $\{n, S_0\}$ is received and verified.

Continuing[GW8] to block 1020, the received $S_i$ HMAC key value is retrieved from the frame. Flowing to block 1030, the received $S_i$ value is hashed, and the hash compared to the last frame's time HMAC key value (assuming that that was verified; if not, verification can be done by repeated hashing until a match is located with a previous verified frame HMAC key value or a match with the signed $S_0$ value). For the first transmission block, the last HMAC key corresponds to the key $S_0$, which is known to and trusted by the client.

Processing continues from block 1030 to block 1040. At block 1040 the HMAC is verified based on the key $S_i$. Processing flows from decision block 1050 to block 1060 when the HMAC is determined to be valid (the key $S_i$ must of course also be verified for this to hold). Otherwise, processing flows from decision block 1050 to block 1080 when the HMAC is determined to be invalid, where the invalid frame is discarded.

At block 1060, the verified value of $S_i$ is stored ready for use in verifying the next block's $S_{i+1}$ key.

Continuing to decision bock 1070, the client evaluates the total number of frames still expected in the current reception. Processing continues from decision block 1070 to block 1020 when additional frames need to be processed, after incrementing time or the frame number index. Alternatively, processing continues from decision block 1070 to termination block 1090 when all frames have been processed.

In another example scenario, the transmission time for a frame (or frame time) is shortened between start and end. Time synchronization may be relatively "loose" such that sending the key at the end of the frame is still risky since the total frame time is shortened, and an attacker can easily retrieve the key in a timely manner. In this example, security can be improved at the cost of some latency by buffering frames and postponing sending the key used to sign a frame until after some intermediate frames have been sent. Generally speaking, the above-described signature/authentication methods require that the key that is used to sign a frame is transmitted "sufficiently late" that it is of no practical use to an attacker, but otherwise sent as early as possible to reduce latency and buffering requirements.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A method for signing frame transmissions from a broadcast server to a client device, comprising:
   obtaining a data block that is scheduled for transmission in a next frame; wherein the next frame includes segment groups; wherein each segment group includes a number (n) of data blocks; wherein each data block includes a plurality of packets;
   selecting a secret key ($S_n$) that is associated with the client device for a predetermined number of the data blocks in the frame;

generating a count that is associated with a time;

computing a set of hash keys using the secret key ($S_n$) and the count;

selecting a hash key ($S_i$) that is associated with the data block, wherein the selected hash key corresponds to one of the set of hash keys;

computing a keyed-hash message authentication code (HMAC) value for the next frame using the hash key ($S_1$);

periodically signing and transmitting a datum containing the hash key of an earlier or initial frame with a digital signature key ($K_S$); and assembling the next frame such that the data block and the HMAC value appear before the hash key in the frame transmission.

2. The method of claim 1 wherein the datum corresponds to at least one of $\{n, S_0\}K_s$ and $(n, b, S_b)$ where b corresponds to a preceding frame number from a previous frame transmission.

3. The method of claim 1, further comprising: selecting the count such that the count is associated with an index of the data block.

4. The method of claim 1, further comprising: selecting the count such that the count corresponds to a time stamp associated with an internal clock in the broadcast server.

5. The method of claim 1, wherein computing the set of hash keys corresponds to applying a one-way hashing function to the secret key ($S_n$) for n iterations such that $S_i$=HASH$(S_{i+1})$.

6. The method of claim 1, wherein computing the HMAC value corresponds to a hashed message authentication code, wherein a value ($H_i$) associated with the hashed message authentication code is given as $H_i$=HMAC($F_i$, $S_i$), where $F_i$ corresponds to the data being signed, $S_i$ the key for signing, and i the sequence number associated with the data and key.

7. The method of claim 1, further comprising: selecting a new secret key as the secret key ($S_n$) when the previous secret key has been applied to n data blocks in the next frame.

8. The method of claim 1, wherein periodically signing the datum comprises signing the datum for every frame.

9. The method of claim 1, further comprising: incrementing the count before retrieving a data block that is scheduled for transmission in the next frame.

10. The method of claim 9, wherein incrementing the count corresponds to at least one of: incrementing a time step in the broadcast server, incrementing the frame number associated with the next frame that is scheduled for transmission, and incrementing the block number associated with the next data block in the next frame that is scheduled for transmission.

11. A method for authenticating frame transmissions from a server to a client device, comprising:

retrieving an Rivest Shamir Adleman (RSA) signed datum from a frame; wherein the frame includes segment groups; wherein each segment group includes data block; wherein each of the data blocks include packets;

verifying an RSA signature associated with the RSA signed datum from the frame;

storing a hash key ($S_0$) that is associated with the frame when the RSA signature is verified;

retrieving another hash key ($S_i$) and an keyed-hash message authenticationcode (HMAC) value from the frame;

verifying the other hash key ($S_i$) that is obtained from a previous frame;

verifying the HMAC value with the other hash key ($S_i$);

computing a hash key using a count and a secert key ($S_i$) that is known by both the server and client device, wherein the count corresponds to a time stamp;

discarding the frame when at least one of the other hash key ($S_i$) and the HMAC value fail verification; and accepting the frame when the other hash key ($S_i$) and the HMAC value are successfully verified.

12. The method of claim 11, identifies the frame number associated with the frame, and identifies the block number that is associated with the frame.

13. The method of claim 11, wherein verifying the other hash key ($S_i$) comprises: retrieving a previously stored hash key, retrieving a count in the client device, computing an expected hash key from the previously stored hash key and the count, and comparing the expected hash key to the other hash key ($S_i$).

14. The method of claim 13, wherein the count corresponds to at least one of: a time stamp in the client device, identifying the frame number associated with the frame, and identifying the block number that is associated with the frame.

15. The method of claim 11, wherein verifying the HMAC value with the other hash key ($S_i$) comprises: computing a value ($H_i$) that is associated with a hashed message authentication code as given by $H_i$=HMAC($F_i$, $S_i$), where $F_i$ corresponds to the data being signed, $S_i$ the key for signing, and i the sequence number associated with the data and key, and comparing the computed value with the retrieved HMAC value from the frame.

16. The method of claim 11, further comprising: storing a verified hash key ($S_i$) for verification of further transmission frames after the hash key is accepted.

17. A broadcast communication system for communicating frame transmissions from a server to a client device, comprising:

a scheduler that is arranged to provide data blocks to the server for transmission in a next frame; wherein each of the data block includes a plurality of packets;

a counter that is arranged to provide a count in the server;

a hashing function in the server that is arranged to compute hash keys for the next frame using the count and a secret key;

an HMAC function in the server that is arranged to provide an HMAC value in response to hash keys associated with the next frame;

a broadcast processor in the server that is arranged to receive the hash keys, HMAC values, and the data blocks, and organize the next frame for transmission such that the data block and the HMAC value appear before the hash key in the frame transmission.

18. The broadcast communication system of claim 17, further comprising:

a broadcast receiver in the client device that is arranged to receive a transmitted frame, wherein the transmitted frame starts with another HMAC value, continues with another signed datum$\{n, S_0\}K_s$ followed by another data block, and ends with another hash key $S_i$;

a counter in the client device that is arranged to provide another count;

a hashing function in the client device that is arranged to compute additional hash keys for the frame transmission using the other count, the secret key, and previously stored hash keys;

a verification function block in the client device that is arranged to verify the other hash key ($S_i$) with the additional hash keys and verify the HMAC value with the other hash key ($S_i$) and previous hash keys;

a means for discarding the frame in the client device when at least one of the other hash key ($S_i$) and the HMAC value fail verification; and a means for accepting the frame in the client device when the other hash key ($S_i$) and the HMAC value are successfully verified.

19. The broadcast communication system of claim 18, further comprising: a means for recording the other hash key ($S_i$) when the frame is accepted, wherein the other hash key ($S_i$) is utilized for verification of subsequently received transmission frames.

20. A system for authenticating frame transmissions in a client device, comprising:

a broadcast receiver that is arranged to receive a transmitted frame, wherein the transmitted frame includes segment groups; wherein each segment group includes data blocks; wherein each of the data blocks include packets; wherein the transmitted frame include an HMAC value and a data block, and ends with a hash key $S_i$;

a counter that is arranged to provide a count that has a time dependence;

a hashing function that is arranged to compute hash keys for the transmitted frame using the count and a secret key;

a verification function block that is arranged to verify the hash key ($S_i$) with the computed hash keys, and also arranged to verify the HMAC value with the hash key ($S_i$) and the previously stored hash keys;

a means for discarding the frame when at least one of the hash key ($S_i$) and the HMAC value fail verification;

a means for accepting the frame when the hash key ($S_i$) and the HMAC value are successfully verified; and a means for storing the hash key as a previously stored hash key when the frame is accepted such that subsequent frames utilize the stored hash key for verification.

* * * * *